(12) United States Patent
Lee

(10) Patent No.: US 7,789,517 B2
(45) Date of Patent: Sep. 7, 2010

(54) LED PACKAGE, DISPLAY PANEL, ILLUMINATION SYSTEM AND PROJECTION SYSTEM EMPLOYING THE SAME

(75) Inventor: Kye-hoon Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1218 days.

(21) Appl. No.: 11/322,561

(22) Filed: Jan. 3, 2006

(65) Prior Publication Data

US 2006/0146297 A1 Jul. 6, 2006

(30) Foreign Application Priority Data

Jan. 5, 2005 (KR) .................. 10-2005-0000824

(51) Int. Cl.
G03B 21/26 (2006.01)
H01J 1/62 (2006.01)
H01J 63/04 (2006.01)
H04N 5/74 (2006.01)

(52) U.S. Cl. .................. 353/94; 313/500; 348/771

(58) Field of Classification Search ............. 353/94, 353/31, 34, 37, 84; 348/771, 742, 743; 349/5, 349/7, 8, 9; 257/88, 89, 918, 5, 59; 362/555, 362/561, 800; 313/500, 498; 250/553, 552
See application file for complete search history.

(56) References Cited

U.S. PATENT DOCUMENTS

| 5,442,414 | A  | * | 8/1995  | Janssen et al. ............. 353/98 |
| 6,227,682 | B1 | * | 5/2001  | Li ............................. 362/302 |
| 6,666,567 | B1 | * | 12/2003 | Feldman et al. ............ 362/237 |
| 6,840,634 | B1 | * | 1/2005  | Chang ......................... 353/99 |
| 6,899,436 | B2 | * | 5/2005  | Slobodin ..................... 353/94 |
| 7,088,321 | B1 | * | 8/2006  | Parker ......................... 345/83 |
| 7,131,735 | B2 | * | 11/2006 | Yokoyama ..................... 353/98 |
| 2002/0140911 | A1 | | 10/2002 | Peterson |
| 2003/0147255 | A1 | * | 8/2003 | Im ............................ 362/558 |
| 2003/0202259 | A1 | | 10/2003 | Nishimae et al. |
| 2003/0218794 | A1 | | 11/2003 | Takeda et al. |

(Continued)

FOREIGN PATENT DOCUMENTS

JP  9-500738  1/1997

(Continued)

OTHER PUBLICATIONS

Dutch Search Report dated Feb. 27, 2008 issued in NL 1030790.

(Continued)

*Primary Examiner*—Georgia Y Epps
*Assistant Examiner*—Ryan Howard
(74) *Attorney, Agent, or Firm*—Stanzione & Kim LLP

(57) ABSTRACT

An LED package having improved light efficiency, and an illumination system and a projection system employing the LED package. An LED package to provide light to a display panel having a plurality of rotatable micromirrors to form images, the LED package includes a substrate and a plurality of LED chips. The plurality of LED chips are slanted with respect to the substrate at a predetermined angle. The LED package improves the light efficiency by arranging the plurality of LED chips so as to correspond to a shape of effective light having an asymmetric distribution with respect to a stop of a projection lens unit.

22 Claims, 9 Drawing Sheets

U.S. PATENT DOCUMENTS

2004/0057025 A1* 3/2004 Dewald et al. .................. 353/97
2005/0094240 A1* 5/2005 Huibers et al. ............... 359/290

FOREIGN PATENT DOCUMENTS

| JP | 2000-112031 | 4/2000 |
| JP | 2001-117505 | 4/2001 |
| JP | 2002-185047 | 6/2002 |
| JP | 2002-214697 | 7/2002 |
| JP | 2003-107396 | 4/2003 |
| JP | 2003-330111 | 11/2003 |
| JP | 2004-93779 | 3/2004 |
| JP | 2004-110062 | 4/2004 |
| JP | 2004-145249 | 5/2004 |
| JP | 2004-151652 | 5/2004 |
| JP | 2004-151657 | 5/2004 |
| JP | 2004-252205 | 9/2004 |
| WO | WO 2005/036888 | 4/2005 |

OTHER PUBLICATIONS

Chinese Office Action dated Jul. 4, 2008 issued in CN 200510132825.X.
Japanese Office Action issued Jan. 12, 2010 in JP Application No. 2005-358217.

* cited by examiner

LED PACKAGE, DISPLAY PANEL, ILLUMINATION SYSTEM AND PROJECTION SYSTEM EMPLOYING THE SAME

CROSS-REFERENCE TO RELATED APPLICATIONS

This application claims the benefit of Korean Patent Application No. 2005-824, filed on Jan. 5, 2005, in the Korean Intellectual Property Office, the disclosure of which is incorporated herein in its entirety by reference.

BACKGROUND OF THE INVENTION

1. Field of the Invention

The present general inventive concept relates to an LED package having improved light efficiency, a display panel, and an illumination system and a projection system employing the LED package.

2. Description of the Related Art

A projection system forms images on a display panel using light emitted from a light source, magnifies and projects the images on a screen through a projection lens unit such that a viewer demand for a large-scale screen can be met. The projection system can use a lamp as the light source. However, the lamp has disadvantages of a big size, an expensive manufacturing price per unit, intense heat emission, and a short life expectancy.

Accordingly, the projection system can use a laser or a light-emitting diode (LED) as the light source instead of the lamp. The LED is advantageous, because it is inexpensive and has a long life expectancy. However, a large number of LEDs are required, because a brightness of a single LED is not sufficient to project the images.

FIG. 1 is a plan view illustrating a conventional LED package 10 used in a projection system. As illustrated in FIG. 1, a plurality of LED chips 15 are arranged at a predetermined interval on an LED substrate 13 in the conventional LED package 10. The LED chips 15 each have a shape that is roughly square. A DMD (Deformable Mirror Device), which is a type of display panel that forms images in the projection system, forms the images using a two-dimensional arrangement of a plurality of micromirrors by independently operating each micromirror.

FIG. 2A is a view illustrating an incident light Li, an effective light Le, an out-of-range light Lo, and an ineffective light Lu provided according to rotational movements of a micromirror 30 when the DMD is used as the display panel to form the images in the projection system. When the micromirror 30 is in an on or an off state, a path of each light beam is illustrated in FIG. 2A after the incident light Li is reflected by the micromirror 30. For example, the display panel, which has an aspect ratio of about 16:9, may be about 2.3 cm in width and about 1 cm in length. The micromirror 30 disposed inside the display panel is extremely small. A size of the micromirror 30 is on a μm (micrometer) scale and it is difficult to precisely control an operation of the micromirror 30. A rotational angle of the micromirror 30 is limited by a structure of the DMD and a cone angle of the incident light is limited by a slant angle a of the micromirror 30.

When the micromirror 30 is in the on-state, the incident light Li is incident on the micromirror 30 at an incident angle a so that the incident light Li may be reflected from the micromirror 30 and progress toward the screen in a perpendicular direction. When the micromirror 30 is in the on-state, light used for forming the images after the incident light Li is reflected from the micromirror 30 is represented by the effective light Le. When the micromirror 30 is in the off-state, light propagating outside of a projection lens unit after the incident light Li is reflected from the micromirror 30 is represented by the ineffective light Lu. A cone angle of the incident light Li needs to be within +a so that the effective light Le and the incident light Li do not interfere with each other. For example, the cone angle of the incident light Li may be within ±12° when a is 12°. Next, the micromirror 30 is tilted to an opposite side and the incident light Li is reflected toward a direction deviated from a vertical axis (i.e., along which the effective light Le is reflected in the on state) when the micromirror 30 is in the off-state. A window 31 covers the micromirror 30 and the out-of-range light Lo is reflected from the window 31.

As mentioned above, the cone angle of the incident light Li is limited to ±a so that the incident light Li and the effective light Le do not interfere with each other. FIG. 2B is a plan view illustrating the incident light Li, the effective light Le, the out-of-range light Lo, and the ineffective light Lu projected onto the same plane surface in order to explain a relationship between a rotational axis C of the micromirror 30 and the effective light Le. The rotational axis C is perpendicular to a first axis X and parallel to a second axis Y with regard to the cone angle illustrated in FIG. 2A. The cone angle of the second axis Y has enough margin compared with the first axis X, because, as illustrated in FIG. 2B, the incident light Li and the effective light Le may interfere with each other along the first axis X, but do not interfere along the second axis Y. Accordingly, it is possible to improve light efficiency by making the cone angle of the second axis Y greater than that of the first axis X. An elliptical light beam can be made using a stop to increase the cone angle of the second axis Y in the projection lens unit.

FIG. 3A is a plan view illustrating a structure of a display panel 35 having the micromirrors 30 arranged in two-dimensions, and a relationship between the rotational axis C of the micromirror 30 and the display panel 35. FIG. 3B is a plan view illustrating a comparison of light 40 illuminated from the conventional LED package effective light 42 formed by the stop of the projection lens unit. The rotational axis C corresponds to the second axis Y. When comparing the illuminated light 40 to the effective light 42 (Le), there is problem in that the light efficiency is deteriorated by the stop that removes a large portion of the illuminated light 40 as illustrated in FIG. 3B, because the incident light Li incident on the display panel 35 has a square distribution in a structure of the conventional LED package, as illustrated in FIG. 1.

SUMMARY OF THE INVENTION

The present general inventive concept provides an LED package having an improved arrangement structure of a plurality of LED chips to increase light efficiency, a display panel and an illumination system and a projection system employing the LED package and/or the display panel.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an LED package to provide light to a display panel having a plurality of rotatable micromirrors to form images, the LED package including a substrate, and a plurality of LED chips arranged on the substrate and slanted at a predetermined angle with respect to the substrate.

The plurality of LED chips may be slanted by the predetermined angle with respect to the substrate, and the predetermined angle corresponds to an angle by which rotational axes of the plurality of micromirrors are slanted with respect to the display panel.

A shape of the LED package may be the same as a shape of the display panel.

The plurality of LED chips may be arranged on the substrate in a rectangular shape.

An aspect ratio of each of the plurality of LED chips may be determined by Fno of a stop provided to a projection lens unit to magnify and project the images formed by the display panel onto a screen.

The foregoing and/or other aspects of the present general inventive concept may also be achieved by providing an LED package usable with a projection system, the LED package comprising a substrate having a shape and an external reference axis, and at least one LED chip having a shape disposed on the substrate and having an internal reference axis such that the internal reference axis is slanted at a predetermined angle with respect to the external reference angle of the substrate.

The foregoing and/or other aspects of the present general inventive concept may also be achieved by providing an illumination system to provide light to a display panel having a plurality of rotatable micromirrors to form images, the illumination system including an LED package having a substrate and a plurality of LED chips arranged at a predetermined angle with respect to the substrate, an optical device to collimate light emitted from the plurality of LED chips, and a light tunnel to receive the collimated light and to make an intensity of the collimated light uniform.

The optical device may include fly-eye lenses and the fly-eye lenses may have an arrangement that corresponds to an arrangement of the plurality of LED chips.

The foregoing and/or other aspects of the present general inventive concept may also be achieved by providing a display panel usable with a projection system, the display panel comprising a panel having a shape and an external reference axis, and at least one rotatable micromirror having a shape disposed on the panel and having an internal reference axis such that the internal reference axis is slanted at a predetermined angle with respect to the external reference angle.

The foregoing and/or other aspects of the present general inventive concept may also be achieved by providing a projection system including an LED package having a substrate and a plurality of LED chips arranged at a predetermined angle with respect to the substrate, an optical device to collimate light emitted from the plurality of LED chips, a light tunnel to make the collimated light have a uniform intensity, a display panel having a plurality of rotatable micromirrors arranged thereon to form images using the light having the uniform intensity, and a projection lens unit to magnify and project the images formed by the display panel onto a screen using a stop to make effective light have an asymmetric distribution with respect to incident light.

The display panel may include the plurality of micromirrors having rotational axes that are arranged in one of a diagonal direction and a parallel direction with respect to a side of the display panel.

The foregoing and/or other aspects of the present general inventive concept may also be achieved by providing a projection system, comprising an LED package to illuminate light, the LED package including a substrate having a first external reference axis, and at least one LED chip disposed on the substrate and having a first internal reference axis such that the first internal reference axis is slanted at a predetermined angle with respect to the first external reference axis, and a display panel to receive the illuminated light from the LED package, the display panel including a panel having a second external reference axis that is an optical conjugate of the first external reference axis, and at least one rotatable micromirror disposed on the panel having a second internal reference axis such that the second internal reference axis is parallel or perpendicular to the second external reference axis.

The foregoing and/or other aspects of the present general inventive concept may also be achieved by providing a projection system, comprising an LED package to illuminate light, the LED package including a substrate having a first external reference axis, and at least one LED chip disposed on the substrate and having a first internal reference axis such that the first internal reference axis is parallel or perpendicular with respect to the first external reference axis, and a display panel to receive the illuminated light from the LED package, the display panel including a panel having a second external reference axis that is an optical conjugate of the first external reference axis, and at least one rotatable micromirror disposed on the panel and having a second internal reference axis such that the second internal reference axis is slanted with respect to the second external reference axis.

The foregoing and/or other aspects of the present general inventive concept may also be achieved by providing a projection system, comprising an LED package having a substrate and a plurality of LED chips arranged on the substrate at a first angle, a display panel having a panel and a plurality of reflectors arranged thereon at a second angle and the reflectors having an axis of rotation, and a projection lens unit having a stop to pass light of a predetermined shape having a longer axis arranged along the axis of rotation of the reflectors, wherein the first and second angles are arranged such that the LED package and the display panel produce a quadrangular illumination that substantially coincides with the predetermined shape along the axis of rotation.

The foregoing and/or other aspects of the present general inventive concept may also be achieved by providing a projection system, comprising an LED package to emit light, the LED package including a substrate having a side and at least one LED chip having a side that is parallel to the side of the substrate, and a display panel to receive the emitted light from the LED package and to reflect the emitted light in a predetermined direction, the display panel including a panel having a side and at least one rotatable micromirror having a side disposed on the panel such that the side of the at least one micromirror has a slanted angle with respect to the side of the panel.

The foregoing and/or other aspects of the present general inventive concept may also be achieved by providing a projection system, comprising an LED package having a reference axis and at least one LED chip having a major axis arranged at a predetermined non-normal angle with respect to the reference axis on a substrate, and a display panel having a second reference axis that is an optical conjugate of the reference axis and at least one micromirror disposed on a panel to rotate about an axis of rotation that has the predetermined non-normal angle with respect to the second reference axis.

The foregoing and/or other aspects of the present general inventive concept may also be achieved by providing a projection system, comprising an LED package to emit light and having a substrate and one or more LED chips arranged at a first angle with respect to a substrate reference axis, a display panel to redirect light received from the LED package in a predetermined direction and having a panel and one or more micromirrors arranged on the panel and having an axis of rotation forming the first angle with respect to a panel reference axis, which is an optical conjugate of the substrate reference axis, and a stop to pass light having a predetermined shape having a longer axis along the axis of rotation of the one or more micromirrors.

The foregoing and/or other aspects of the present general inventive concept may also be achieved by providing a projection system, comprising an illumination unit to produce a rectangular illumination light having a first reference axis, a display panel to redirect the rectangular illumination light as a rectangular image having a second reference axis that is an optical conjugate of the first reference axis, and a projection system to process the rectangular image including a stop having a large axis and a small axis to pass light of a predetermined shape. The display panel redirects the rectangular image such that a large and small axis thereof corresponds to the large and small axis of the stop.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
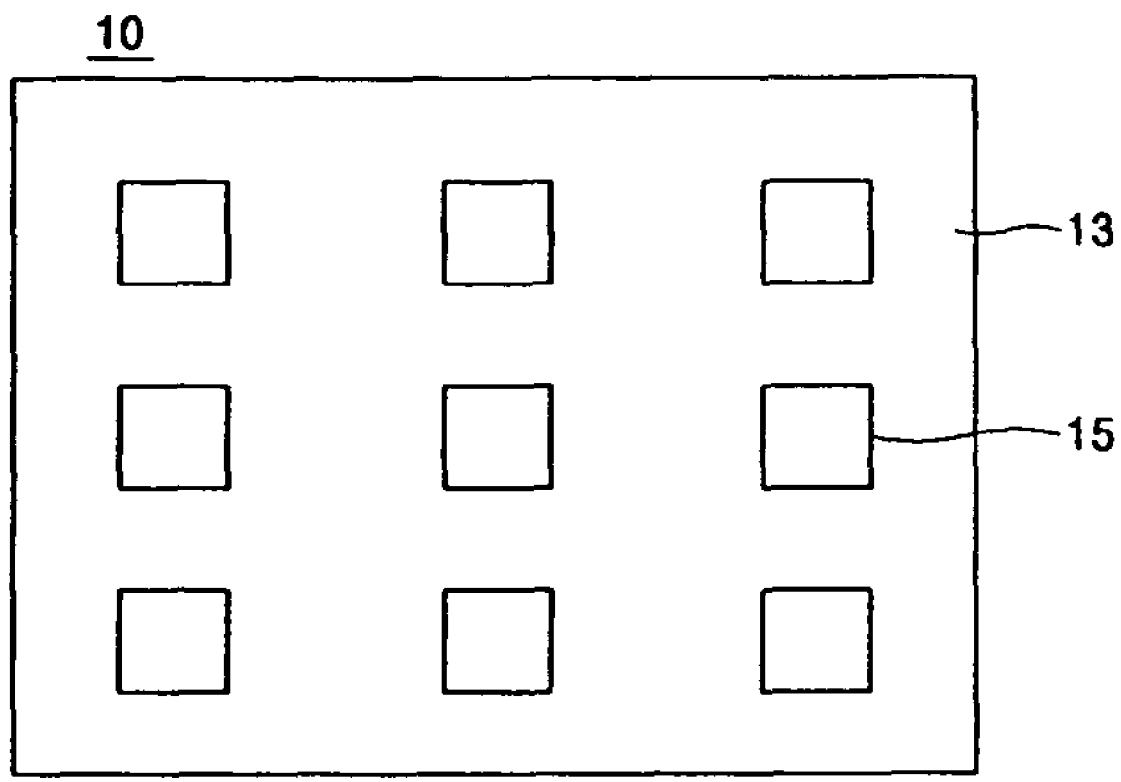
FIG. 1 is a plan view illustrating a conventional LED package used in a projection system.
Figure 2A:
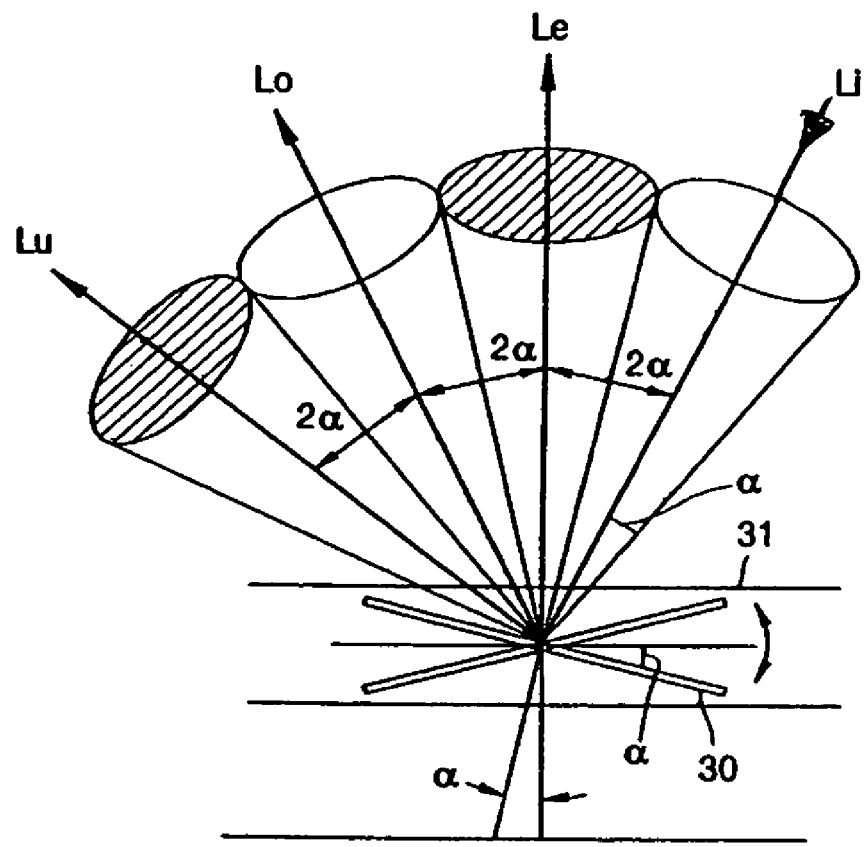
FIG. 2A is a view illustrating incident light, effective light, out-of-range light, and ineffective light provided according to rotational movements of a micromirror when a DMD is used as a display panel to form images in a projection system.
Figure 2B:
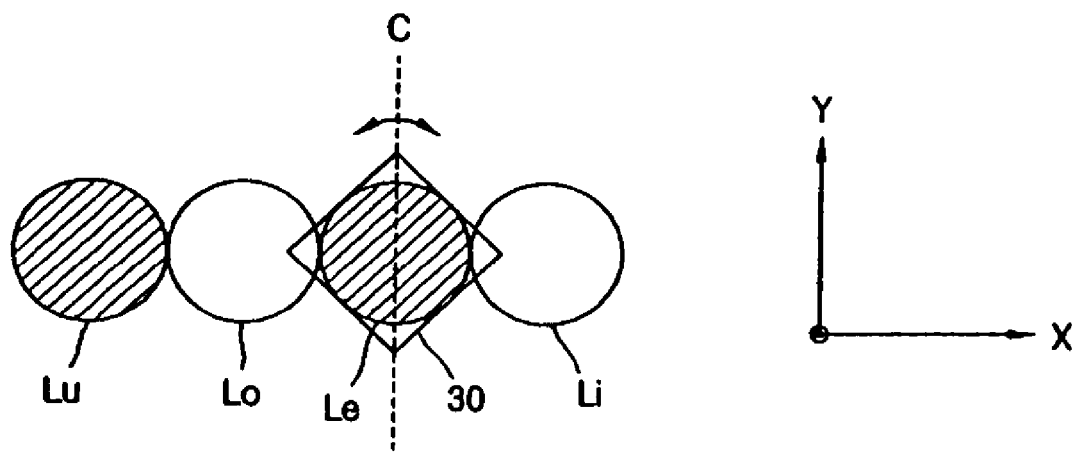
FIG. 2B is a view illustrating incident light, effective light, out-of-range light, and ineffective light projected on a plane using micromirrors.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 4:
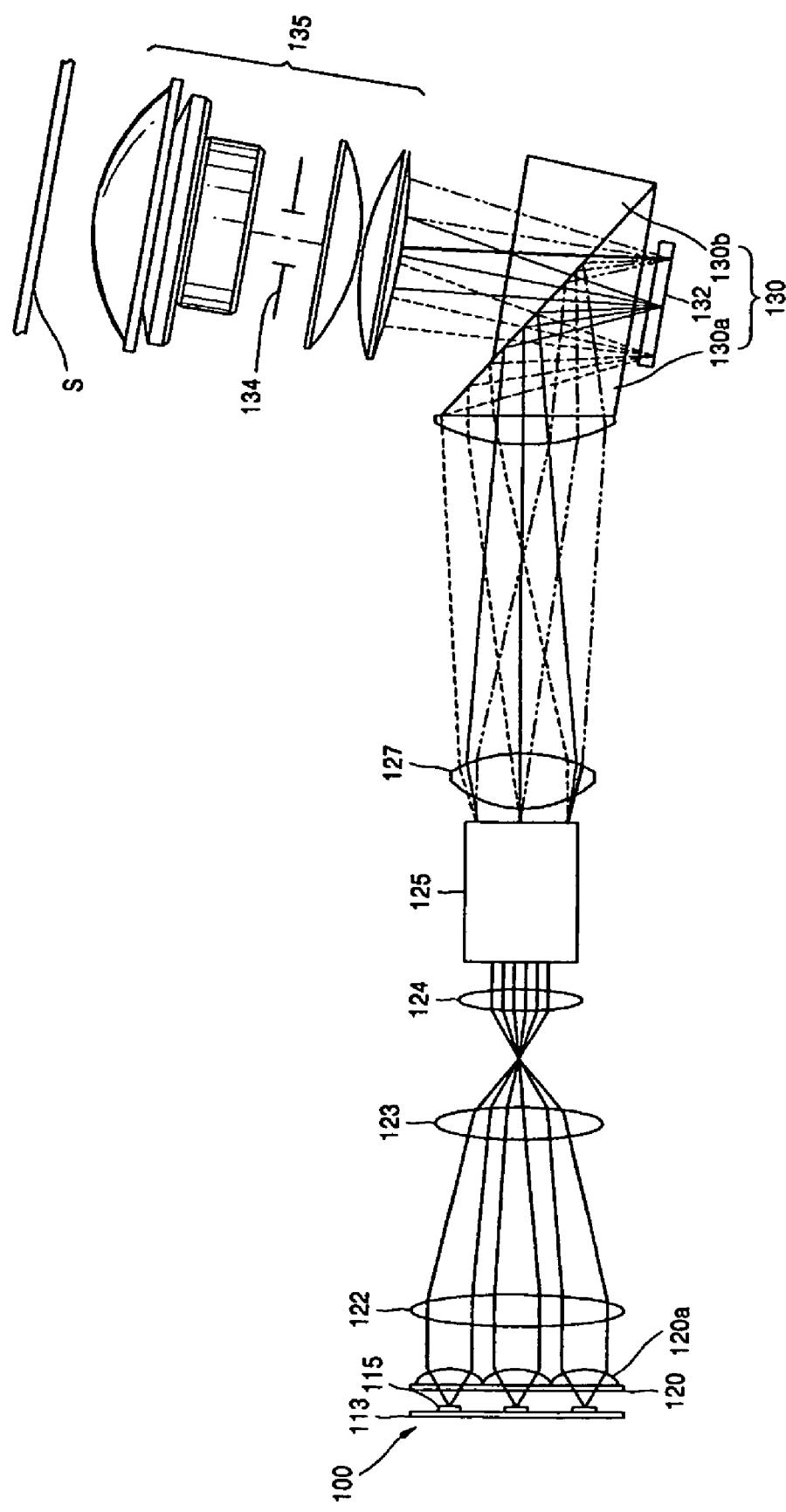
FIG. 4 is a plan view illustrating an illumination system and a projection system according to an embodiment of the present general inventive concept.

Referring to FIG. 4, a projection system according to an embodiment of the present general inventive concept includes an LED package 100 to illuminate light, a display panel 132 to form images using the light illuminated from the LED package 100, and a projection lens unit 135 to magnify and project the images onto a screen S.

An optical device 120 changes light illuminated from the LED package 100 into parallel light (i.e., collimates the light) and a light tunnel 125 makes intensity of the collimated light uniform.

A first condensing lens 122, a second condensing lens 123, and a third condensing lens 124 are disposed along an optical path between the optical device 120 and the light tunnel 125. A total-reflection prism 130 reflects all light that passes through a fourth condensing lens 127 and the light tunnel 125 and is disposed in an optical path between the light tunnel 125 and the display panel 132.

The total-reflection prism 130 includes an incident-side prism 130a to reflect all light emitted from the LED package 100 toward the display panel 132 and an outgoing-side prism 130b to transmit light reflected from the display panel 132 toward the projection lens unit 135. The projection lens unit 135 has a stop 134 to pass effective light reflected by the display panel 132. The stop 134 may be used to pass the effective light that is not interfered with by the incident light (i.e., light incident onto the display panel 132). The stop 134 may pass light having an elliptical shape.

Figure 5:
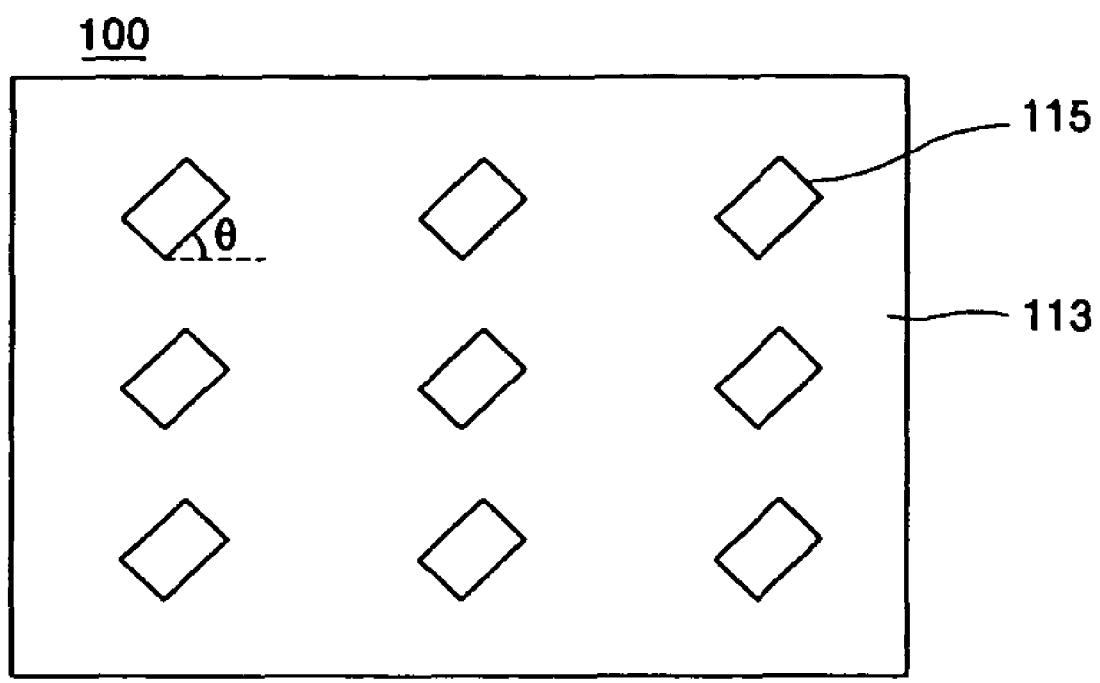
FIG. 5 is a plan view illustrating an LED package according to an embodiment of the present general inventive concept.

FIG. 5 is a plan view illustrating the LED package 100 of FIG. 4 according to an embodiment of the present general inventive concept. Referring to FIG. 5, the LED package 100 includes a substrate 113 having an arrangement of a plurality of LED chips 115. The LED chips 115 are slanted with respect to the substrate 113 at a predetermined slant angle ?. For example, when the LED chips 115 are arranged along a line, each LED chip 115 is slanted with respect to the substrate 113. Each LED chip 115 may include an LED chip substrate and/or one or more semiconductor layers (e.g., light emitting diode) formed on the LED chip substrate to emit light. In other words, either the one or more semiconductor layers, the LED chip substrate, or both the LED chip substrate and the one or more semiconductor layers can be slanted with respect to the substrate 113 at the predetermined slant angle. A shape of each LED chip 115 may vary, but may be formed with respect to a reference axis of the substrate 113 (described below with reference to FIGS. 9A and 9B). For example, when the shape is a rectangle, the reference axis may correspond to a longer dimension of the rectangle. The LED chip 115 and/or the substrate 113 may alternatively have other shapes, such as a triangle, trapezoid, etc. Each LED chip 115 may include an internal reference axis that may correspond to a major axis of the LED chip 115. When the LED chip 115 has the rectangular shape, the internal reference axis can correspond to a longer side of the LED chip 115, an axis that passes through a center of the LED chip 115 parallel to the longer side, a shorter side of the LED chip 115, or an axis that passes through the center of the LED chip 115 parallel to a shorter side thereof. The substrate 113 (and/or the LED package 100) includes the reference axis as an external reference axis. The reference axis can correspond to a longer side of the substrate 113, a shorter side of the substrate 113, or an axis passing through a center of the substrate 113 that is parallel to either of the longer or shorter sides thereof. The internal reference axis of each LED chip 115 is slanted with respect to the reference axis of the substrate 113. If the shapes of the LED chip 115 and the substrate 113 are not rectangular, the reference axis of the LED chip 115 may be a perpendicular line to a base of the shape of the LED chip 115 when the shape of the LED chip 115 is similar to the shape of the substrate 113. The internal reference axis of the LED chip 115, which is parallel to the side of the LED chip 115, is slanted with respect to the reference axis of the substrate 113, which is parallel to the side of the substrate 113. When the LED chips 115 are arranged in rows along parallel lines, the LED chips 115 are slanted with respect to the parallel lines. When the shapes of each LED chip 115 and the substrate 113 are similar to each other, each side of the LED chip 115 is not normal to the corresponding side of the substrate 113. In other words, the LED chips 115 are arranged such the corresponding internal reference axes are slanted with respect to the external reference axis of the substrate 113. The slanted LED chips 115 may include both the LED chip substrate and the one or more semiconductor layers (e.g., the light emitting diode), or just the one or more semiconductor layers to emit light.

The predetermined slant angle ? of the LED chips 115 may be varied depending on a structure of the display panel 132. The predetermined slant angle ? of the LED chips 115 may be an angle at which a rotational axis of a micromirror is slanted with respect to the display panel 132.

Figure 6A:
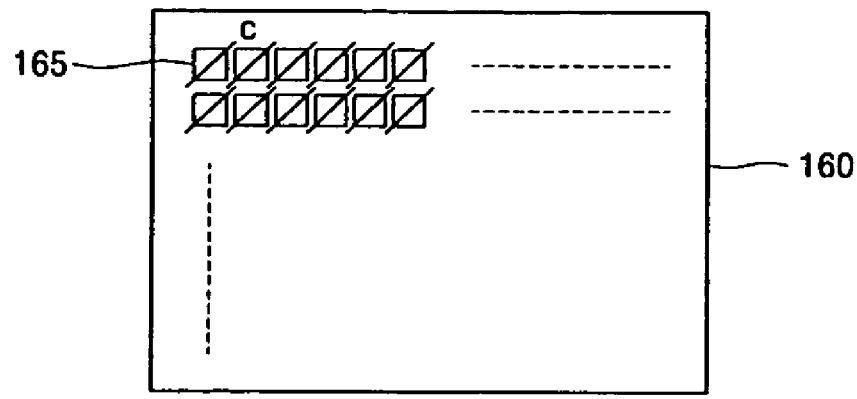
FIGS. 6A and 6B are plan views illustrating an arrangement of a display panel usable with a projection system according to an embodiment of the present general inventive concept.
Figure 6B:
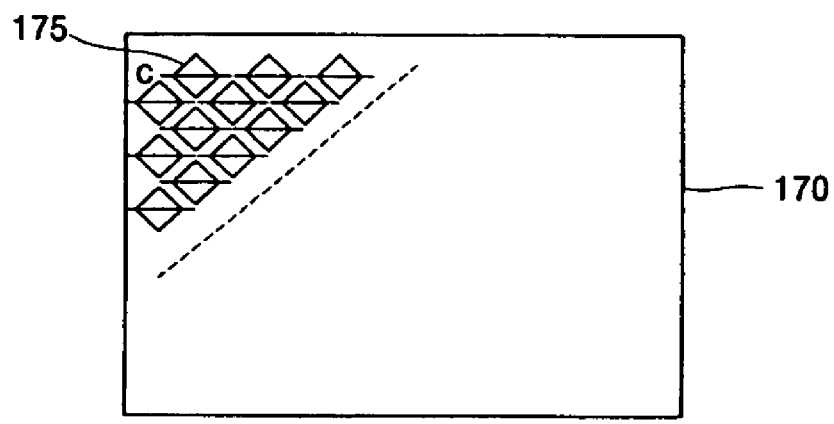
Figure 7:
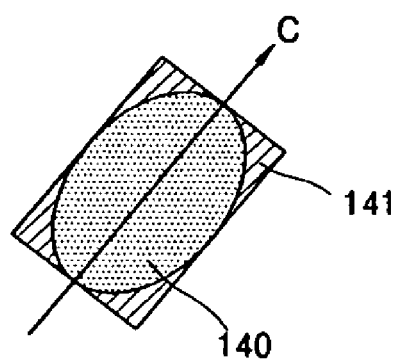
FIG. 7 is a plan view illustrating a comparison between illuminating light emitted from a light tunnel and elliptical effective light formed by a stop usable with a projection lens unit according to an embodiment of the present general inventive concept.

FIGS. 6A and 6B are plan views illustrating an arrangement of the display panel 132 of FIG. 4 according to an embodiment of the present general inventive concept. The display panel 132 has a panel 160 having a plurality of micromirrors 165 arranged in rows as pixel units to constitute an image using the light emitted from the LED chips 115, and the micromirrors 165 rotate around a rotational axis C as illustrated in FIG. 6A. The micromirrors 165 are arranged side by side in a rectangular shape on the panel 160 and the rotational axis C is positioned in a diagonal direction with respect to each of the micromirrors 165. As described below with reference to FIGS. 9A and 9B, the display panel 160 may have a reference axis that is an optical conjugate of the LED package 100. As illustrated in FIG. 7, when the display panel 132 has a structure illustrated in FIG. 6A, effective light 140 formed by the stop 134 of the projection lens unit 135 becomes an elliptical shape having a longer axis in a direction of the rotational axis C of the micromirrors 165. When the plurality of micromirrors 165 are disposed in parallel lines, the rotational axes C of the plurality of micromirrors 165 are not parallel to the parallel lines in which the micromirrors are disposed.

Figure 3A:
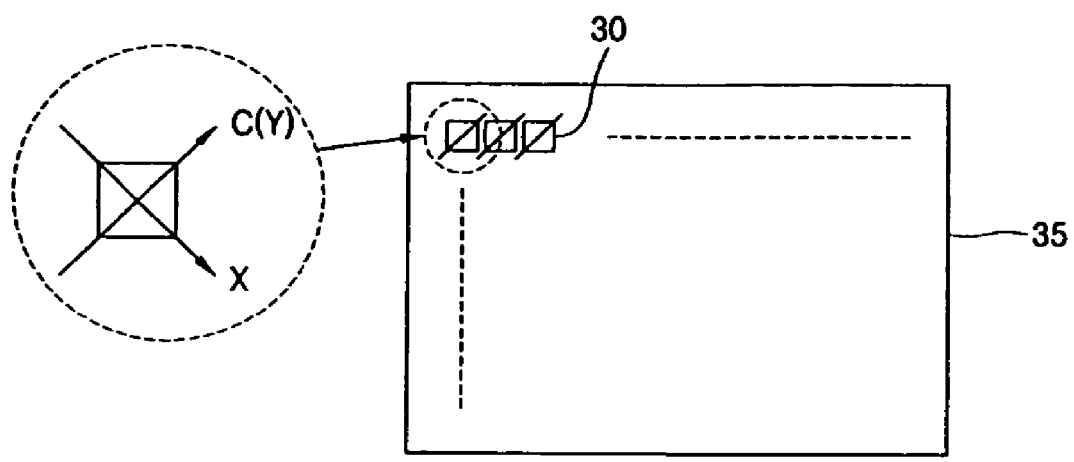
FIG. 3A is a view illustrating a DMD used as a display panel of a projection system.
Figure 3B:
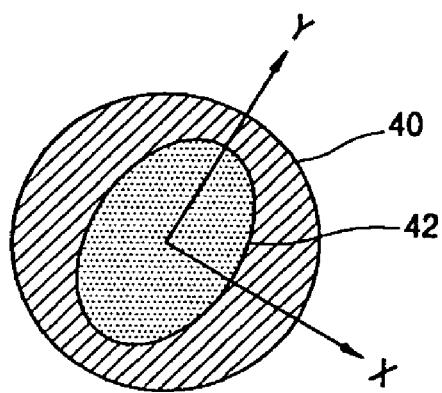
FIG. 3B is a plan view illustrating a comparison between effective light distribution formed by a stop used with a projection lens unit in a projection system and a light distribution formed by an illumination system using the conventional LED package of FIG. 1.

The LED chip 115 may have a rectangular shape to produce illuminating light 141 to have a corresponding shape. The stop 134 then transforms the rectangular shaped illuminating light 141 into the effective light 140 having an elliptical shape. An aspect ratio of the rectangular arrangement of LED chips 115 may be determined by an Fno of the stop 134. Since Fno=focal length/effective aperture, the aspect ratio of the rectangular arrangement of LED chips 115 is a reciprocal number of an effective aperture ratio of a longer axis of the stop 134 to a shorter axis of the stop 134. The effective aperture ratio is the same as a length ratio of a longer axis of the elliptical effective light 140 to a shorter axis of the elliptical effective light 140 as illustrated in FIG. 7. The area of the effective light 140 is at least 80% of the area of the of the illuminating light 141 as compared to the ratio of the effective light 42 and the illuminating light 40 of FIG. 3B.

Figure 8A:
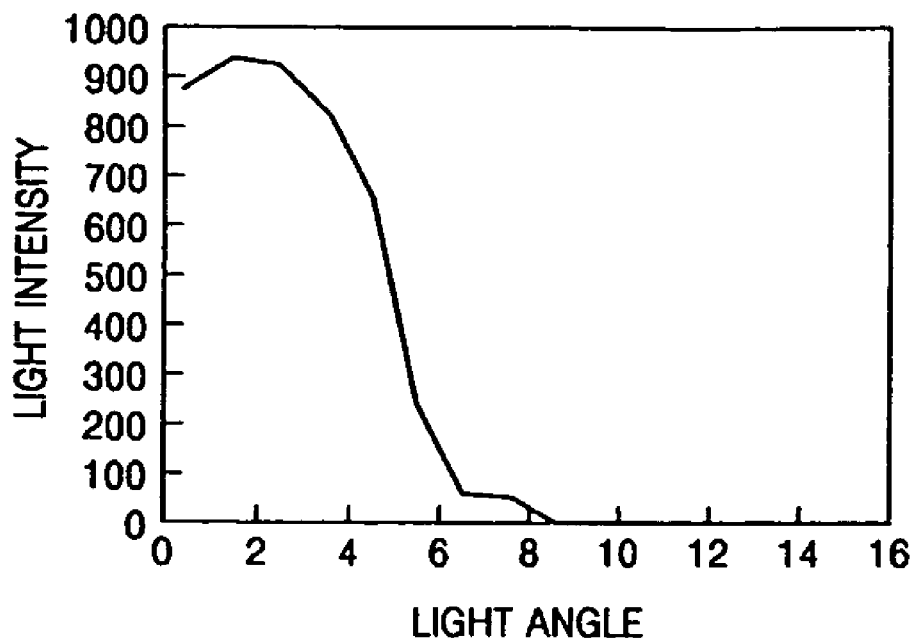
FIGS. 8A and 8B are graphs illustrating a distribution of light intensity according to a light angle of light illuminated from an LED package according to an embodiment of the present general inventive concept.
Figure 8B:
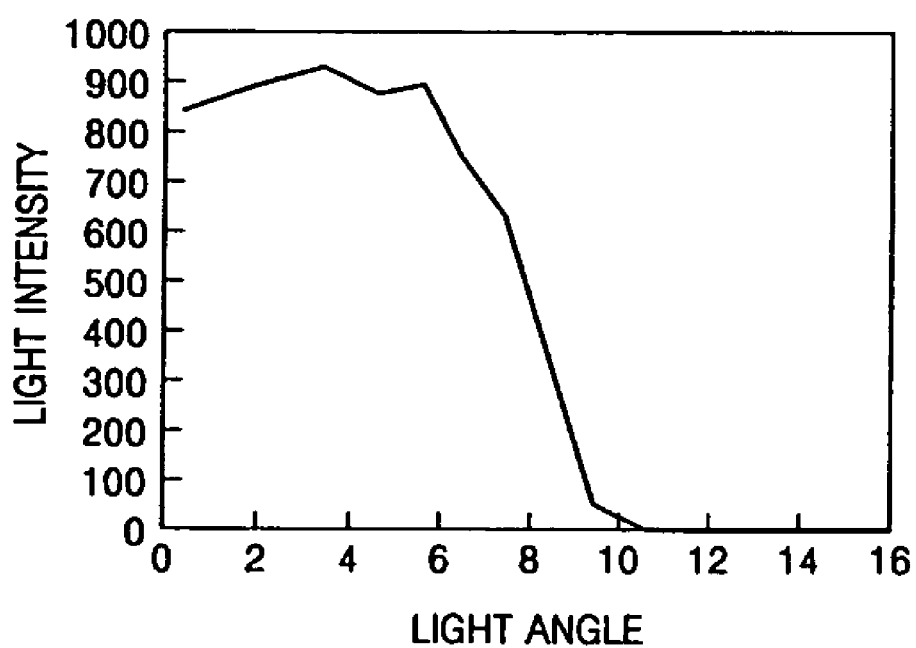

The predetermined slant angle ? of the LED chips 115 may be the same angle as an angle at which the rotational axes C of the micromirrors 165 are arranged with respect to the panel 160. When the predetermined slant angle ? of the LED chips 115 is the same as the angle at which the rotational axes C of the micromirrors 165, the illuminating light 141 that is produced by the optical device 120 and the light tunnel 125 has a light distribution having a cone angle with a slanted rectangular shape as illustrated in FIG. 7. Accordingly, when comparing the effective light 140 to the illuminating light 141, a light quantity removed from the illuminating light 141 can be minimized. FIG. 8A is a graph illustrating a distribution of light intensity according to a light angle along a direction of a longer axis of the illuminating light 141. Additionally, it should be understood that the relationship between the LED chips 115 and the micromirrors 165 may not be one to one. FIG. 8B is a graph illustrating a distribution of the light intensity according to the light angle along a direction of a shorter axis of the illuminating light 141. The light efficiency can be improved by enhancing a ratio of the effective light 140 to the illuminating light 141 according to the distribution of the light intensity. The illuminating light 141 received by the stop 134 has a rectangular shape having a longer axis and a shorter axis. The light efficiency is improved by making the longer axis of the rectangular illuminating light 141 coincide with the longer axis of elliptical effective light 140.

As illustrated in FIG. 6B, micromirrors 175 can be arranged in a manner such that sides of the micromirrors 175 are not parallel or perpendicular to sides of a panel 170, as pixel units to constitute an image using the light emitted from the LED chips 115. Rotational axes C of the micromirrors 175 can be arranged in a parallel direction or a perpendicular direction with respect the sides of the panel 170. When the rotational axes C of the micromirror 175 are arranged in a parallel direction with respect to the sides of the panel 170, a longer axis of a rectangular arrangement of the LED chips 115 may be arranged in a parallel direction with respect to a longer side of the substrate 113 (see FIG. 5). Moreover, when the rotational axis C of the micromirror 175 is arranged in the perpendicular direction with respect to the panel 170, the longer axis of the rectangular LED chip 115 may be arranged in the perpendicular direction with respect to the longer side of the substrate 113. The LED package 100 may have a shape that is similar to a shape of the display panel 132. An aspect ratio of the LED package 100 may be approximately the same as an aspect ratio of the display panel 132. The plurality of micromirrors 175 are arranged in parallel lines that extend diagonally along the panel 170 such that the sides of the micromirrors 175 are not parallel to the sides of the panel 170. When the plurality of micromirrors 175 are disposed in the parallel lines, the rotational axes C of the plurality of micromirrors 175 are not parallel to the parallel lines in which the micromirrors are disposed on the panel 170. The rotational axes C are parallel to the sides of the panel 170.

The optical device 120 collimates the light emitted from the LED package 100. For example, a fly-eye lens can be used as the optical device 120. Lens cells 120a may have a one-to-one correspondence with respect to the LED chips 115. As a result, each lens cell 120a of the optical device faces each LED chip 115.

Collimated light that passes through the optical device 120 is made uniform by passing through the light tunnel 125. The light passing through the light tunnel 125 has a slant angle and a roughly rectangular distribution according to a shape of the LED chips 115 and the predetermined slant angle ? thereof. The illuminating light 141 having the roughly rectangular distribution is totally reflected by the incident-side prism 130a and is incident on the display panel 132. The incident light is reflected by the display panel 132 and is emitted toward the projection lens unit 135 through the incident-side prism 130a and the outgoing-side prism 130b.

A quantity of light that is removed by the stop 134 of the projection lens unit 135 can be minimized because the light reflected by the display panel 132 may be formed into a shape of the effective light 140 that would be formed by the stop 134. Consequently, less light from the illuminating light 141 is blocked by the stop 134, and light efficiency of the illumination system and the projection system can be improved. In other words, by arranging the LED chips 115 and the micromirrors 165 and 175 as described and illustrated in the embodiments of the present general inventive concept, the illumining light 141 can be formed in a rectangular shape as illustrated in FIG. 7 rather than a circular shape illustrated in FIG. 3B of the prior art.

The projection lens unit 135 magnifies images formed by the display panel 132, displays the images as large-sized images on the screen S, and provides the images with a greater brightness when the light efficiency is improved.

Figure 9A:
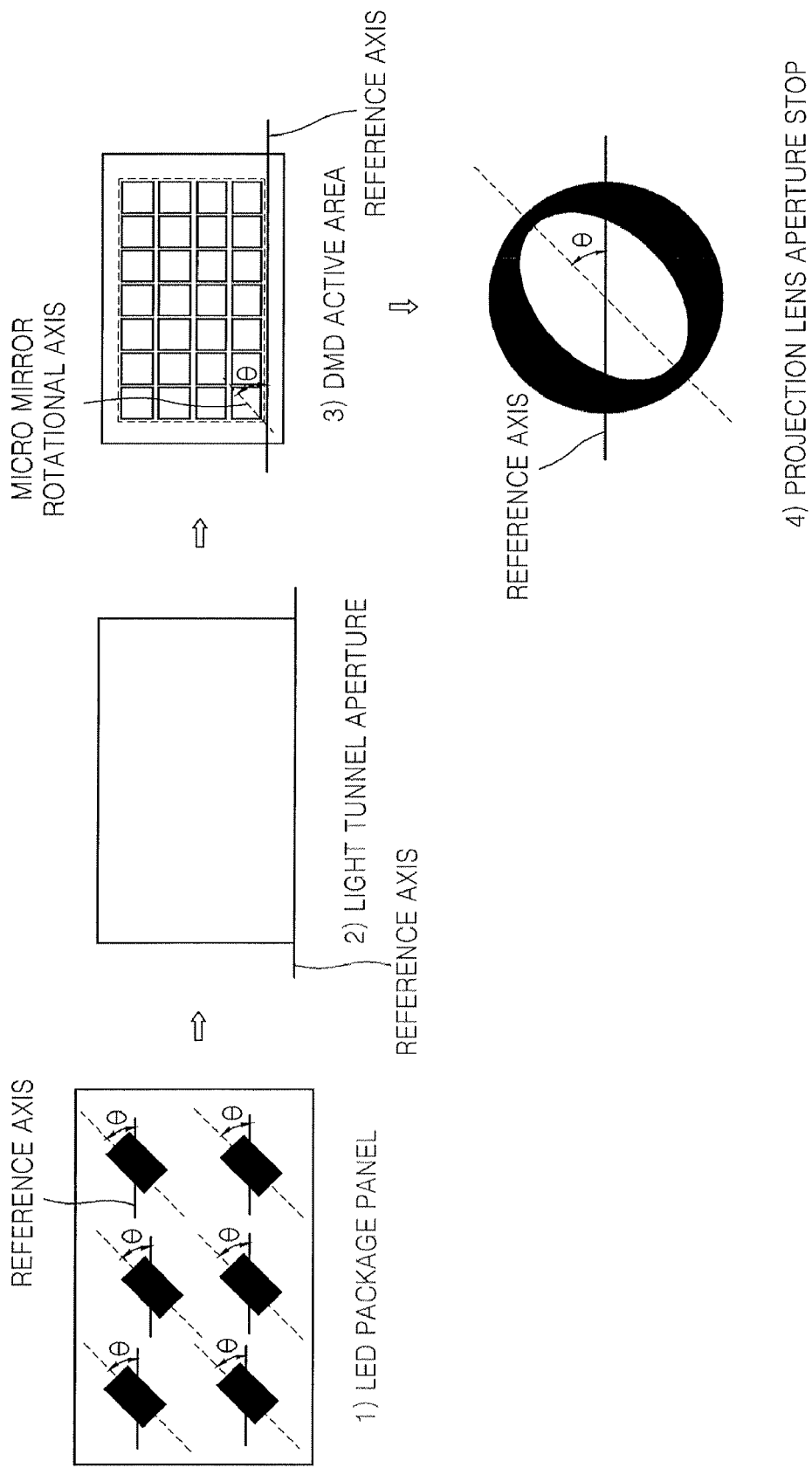
FIGS. 9A and 9B are graphs illustrating an optical relationship and orientation of the illumination system and projection system of FIG. 4 according to an embodiment of the present general inventive concept.
Figure 9B:
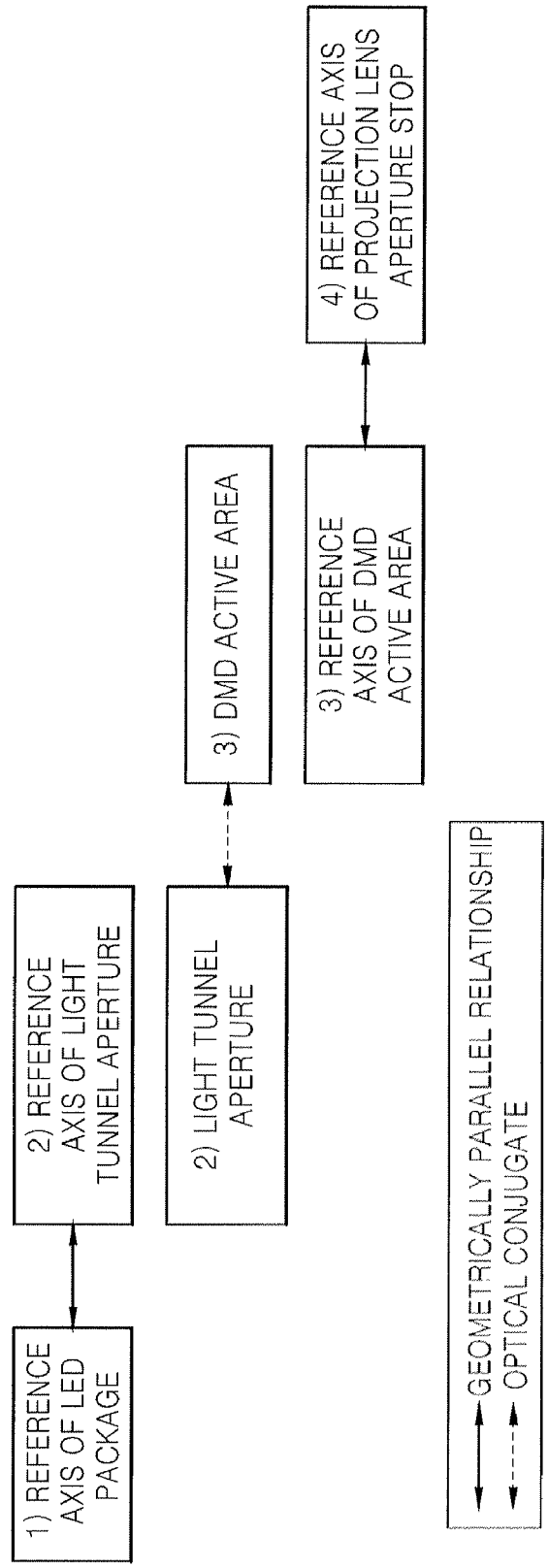

FIGS. 9A and 9B are graphs illustrating an optical relationship and orientation of the illumination system and projection system of FIG. 4 according to an embodiment of the present general inventive concept. Referring to FIGS. 4, 6A, and 9A, the reference axis of the substrate 113 (and/or LED package 100) is used to measure the predetermined slant angle of the LED chips 115. The display panel 132 and 160 (i.e., DMD active area) also has a reference axis that has an angle with respect to the rotational axis of the micromirrors 165 that is equal to the predetermined slant angle. Also as illustrated in FIG. 9A, the stop 134 has a reference axis that has an angle with the longer axis thereof that is equal to the predetermined slant angle. Referring to FIGS. 4, 6A, and 9B, the illumination system including the LED package 100 and the light tunnel 125 may have the same reference axis. In other words, the reference axis of the LED package 100 may be geometrically parallel to the reference axis of the light tunnel 125. Similarly, the projection system including the display panel 132 and 160 and the stop 134 may have the same reference axis. That is, the reference axis of the display panel 132 and 160 (i.e., DMD active area) may be geometrically parallel to the reference axis of the stop 134. The reference axis of the illumination system may be the optical conjugate of the reference axis of the projection system. In other words, the reference axis of the LED package 100 is the optical conjugate of the reference axis of the display panel 132 and 160. Additionally, the reference axis of the illumination system and the projection system can define a reference plane that contacts a surface of the LED package 100 at a right angle and a surface of the display panel 132 and 160 at a right angle. The reference axes of the illumination system and the projection system can be defined as the lines along which the reference plane contacts each of the LED package 100 and the display panel 132 and 160, respectively. Referring to FIGS. 4 and 6B, when the micromirrors 175 are positioned such that their respective rotational axes are parallel or perpendicular to the side of the display panel 170, the reference axis of the display panel 132 and 170 forms the predetermined slant angle with respect to an angle at which the micromirrors 175 are arranged. The reference axis of the display panel 170 may also be the optical conjugate of the reference axis of the LED package 100.

As described above, the LED package of various embodiments of the present general inventive concept improves light efficiency by arranging LED chips so that they correspond to a shape of effective light having an asymmetric distribution using a stop of a projection lens unit. Improvement of the light efficiency reduces power consumption and reduces an amount of heat in the LED package. As a result, keeping the LED package cool becomes easier.

An illumination system and a projection system according to the various embodiments of the present general inventive concept provide brighter images by employing an LED package having an improved structure that matches a structure of a display panel.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination system to provide light to a display panel having a plurality of rotatable micromirrors to form images, the illumination system comprising:
   an LED package having a substrate and a plurality of LED chips each arranged slanted with respect to the substrate at a predetermined angle;
   an optical device to collimate light emitted from the plurality of LED chips; and
   a light tunnel to receive the collimated light from the optical device and to make an intensity of the collimated light uniform,
   wherein the plurality of LED chips are arranged to have a rectangular shape, and
   wherein an aspect ratio of the arrangement of the plurality of LED chips are determined by Fno of a stop provided in a projection lens unit to magnify and project the images formed by the display panel onto a screen.

2. The illumination system of claim 1, wherein the plurality of LED chips are arranged slanted with respect to the substrate, and the predetermined angle corresponds to an angle by which a rotational axis of the plurality of micromirrors are slanted with respect to the display panel.

3. The illumination system of claim 1, wherein a shape of the LED package is the same as a shape of the display panel.

4. The illumination system of claim 1, wherein the optical device comprises fly-eye lenses.

5. The illumination system of claim 4, wherein the fly-eye lenses have an arrangement that corresponds to an arrangement of the plurality of LED chips.

6. A projection system, comprising:
   an LED package having a substrate and a plurality of LED chips each arranged slanted with respect to the substrate at a predetermined angle;
   an optical device to collimate light emitted from the plurality of LED chips;
   a light tunnel to make the collimated light have a uniform intensity;
   a display panel having a plurality of rotatable micromirrors arranged thereon to form images using the light having the uniform intensity; and
   a projection lens unit to magnify and project the images formed by the display panel onto a screen using a stop making effective light have an asymmetric distribution with respect to incident light,
   wherein the LED chips are arranged to have a rectangular shape, and
   wherein an aspect ratio of the plurality of LED chips are determined by Fno of the stop.

7. The projection system of claim 6, wherein the plurality of LED chips are arranged slanted with respect to the substrate, and the predetermined angle corresponds to an angle by which a rotational axis of the plurality of micromirrors are inclined with respect to the display panel.

8. The projection system of claim 6, wherein a shape of the LED package is the same as a shape the display panel.

9. The projection system of claim 6, wherein the aspect ratio of the plurality of LED chips are a reciprocal number of an effective aperture ratio of a longer axis of the stop to a shorter axis of the stop.

10. The projection system of claim 6, wherein the optical device comprises fly-eye lenses.

11. The projection system of claim 10, wherein the fly-eye lenses have an arrangement that corresponds to an arrangement of the plurality of LED chips.

12. The projection system of claim 6, wherein the display panel comprises the plurality of micromirrors having rotational axes that are arranged in one of a diagonal direction and a parallel direction with respect to a side of the display panel.

13. A projection system, comprising:
an LED package to illuminate light, the LED package including:
a substrate having a first external reference axis, and
at least one LED chip disposed on the substrate having a first internal reference axis such that the first internal reference axis is slanted at a predetermined angle with respect to the first external reference axis; and
a display panel to receive the illuminated light from the LED package, the display panel including:
a panel having a second external reference axis that is an optical conjugate of the first external reference axis, and
at least one rotatable micromirror disposed on the panel having a second internal reference axis such that the second internal reference axis is parallel or perpendicular to second external reference axis,
wherein the at least one LED chip comprises one or more LED chips arranged along a line parallel to the first external reference axis, and each of the one or more LED chips comprises a longitudinal axis parallel to the first internal reference axis,
wherein the substrate, panel, at least one LED chip, and at least one micromirror have similar predetermined shapes, and the first and second internal reference axis and the first and second external reference axes are parallel to a side of the corresponding predetermined shapes thereof.

14. A projection system, comprising:
an LED package to illuminate light, the LED package including:
a substrate having a first external reference axis, and
at least one LED chip disposed on the substrate having a first internal reference axis such that the first internal reference axis is slanted at a predetermined angle with respect to the first external reference axis; and
a display panel to receive the illuminated light from the LED package, the display panel including:
a panel having a second external reference axis that is an optical conjugate of the first external reference axis, and
at least one rotatable micromirror disposed on the panel having a second internal reference axis such that the second internal reference axis is parallel or perpendicular to the second external reference axis,
wherein the at least one LED chip comprises one or more LED chips arranged along a line parallel to the first external reference axis, and each of the one or more LED chips comprises a longitudinal axis parallel to the first internal reference axis,
wherein the at least one rotatable micromirror is rotatable about an axis arranged at the predetermined angle with respect to the second external reference axis.

15. A projection system, comprising:
an LED package to illuminate light, the LED package including:
a substrate having a first external reference axis, and
at least one LED chi disposed, on the substrate having a first internal reference axis such that the first internal reference axis is slanted at a predetermined angle with respect to the first external reference axis; and
a display panel to receive the illuminated light from the LED package, the display panel including:
a panel having a second external reference axis that is an optical conjugate of the first external reference axis, and
at least one rotatable micromirror disposed on the panel having a second internal reference axis such that the second internal reference axis is parallel or perpendicular to the second external reference axis,
wherein the at least one LED chip comprises one or more LED chips arranged line parallel to the first external reference axis, and each of the one or more LED chips comprises a longitudinal axis parallel to the first internal reference axis,
wherein shapes of the substrate and the at least one LED chip comprise rectangles, and the first external reference axis is parallel to a side of the substrate, and the first internal reference axis is parallel to a side of the at least one LED chip.

16. A projection system, comprising
an LED package to illuminate light the LED package including:
a substrate having a first external reference axis, and
at least one LED chip disposed on the substrate having a first internal axis such that the first internal reference axis is slanted at a predetermined angle with respect to the first external reference axis; and
a display panel to receive the illuminated light from the LED package, the display panel including:
a panel having a second external reference axis that is an optical conjugate of the first external reference axis, and
at least one rotatable micromirror disposed on the panel having a second internal reference axis such that the second internal reference axis is parallel or perpendicular to the second external reference axis,
wherein the at least one LED chip comprises one or more LED chips arranged along a line parallel to the first external reference axis, and each of the one or more LED chips comprises a longitudinal axis parallel to the first internal reference axis,
wherein shapes of the panel and the at least one micromirror are similar and shapes of the substrate and the at least one LED chip are similar, and the first internal, second internal, first external, and second external reference axes are positioned at a similar position within the at least one LED chip, the at least one micromirror, the substrate, and the panel.

17. A projection system, comprising:
an LED package to illuminate light, the LED package including:
a substrate having a first, external reference axis and
at least one LED chip disposed on the substrate having a first internal reference axis such that the first internal reference axis is slanted at a predetermined angle with respect to the first external reference axis; and display panel to receive the illuminated light from the LED package, the display panel including:
a panel having a second external reference axis that is an optical conjugate of the first external reference axis and
at least one rotatable micromirror disposed on the panel having a second internal reference axis such that the second internal reference axis is parallel to the perpendicular to the second external reference axis,
wherein the at least one LED chip comprises one or more LED chips arranged along a line parallel to the first external reference axis, and each of the one or more LED chips comprises a longitudinal axis parallel to the first internal reference axis,
wherein the at least one LED chip comprises a plurality of LED chips arranged in a plurality of lines that are parallel to a side of the substrate such that sides of the plurality of LED chips are not parallel to the side of the substrate.

18. A projection system, comprising:
an LED package having a substrate and a plurality of LED chips arranged on the substrate at a first angle;
a display panel having a panel and a plurality of reflectors arranged thereon at a second angle and the reflectors having an axis of rotation; and
a projection lens unit having a stop to pass light of a predetermined shape having a longer axis arranged along the axis of rotation of the reflectors,
wherein the first and second angles are arranged such that the LED package and the display panel produce a quadrangular illumination that substantially coincides with the predetermined shape along the axis of rotation,
wherein the plurality of LED chips are arranged at the first angle with respect to a side of the substrate, and the first angle is non-zero and non-perpendicular, and the axis of rotation has the first angle with respect to a side of the panel, and an axis extending along the side of the substrate is an optical conjugate of an axis extending along the side of the panel.

19. The projection system of claim 18, wherein the plurality of reflectors are arranged at the second angle with respect to a side of the panel, and the second angle is non-zero and non-perpendicular, and the axis of rotation has the first angle with respect to the side of the panel,
wherein the axis of rotation is parallel to the side of the panel.

20. A projection system, comprising:
an LED package having a reference axis and at least one LED chip having a major axis arranged at a predetermined non-normal angle with respect to the reference axis on a substrate; and
a display panel having a second reference axis that is an optical conjugate of the reference axis and at least one micromirror disposed on a panel to rotate about an axis of rotation that has the predetermined non-normal angle with respect to the second reference axis.

21. The projection system of claim 20, wherein the first and second reference axes are defined by where a reference plane contacts a surface of the LED package and a surface of the display panel, respectively.

22. A projection system, comprising:
an LED package to emit light and having a substrate and one or more LED chips arranged at a first angle with respect to a substrate reference axis;
a display panel to redirect light received from the LED package in a predetermined direction and having a panel and one or more micromirrors arranged on a panel and having an axis of rotation forming the first angle with respect to a panel reference axis, which is an optical conjugate of the substrate reference axis; and
a stop to pass light having a predetermined shape having a longer axis along the axis of rotation of the one or more micromirrors,
wherein the predetermined shape is elliptical and the first angle of the LED chips and the axis of rotation is arranged such that a rectangular illumination light produced by the LED package and the display panel has a longer axis that corresponds to the longer axis of the predetermined shape and a shorter axis of the rectangular illumination light corresponds shorter axis of the predetermined shape.

* * * * *